(12) United States Patent
Nadumane et al.

(10) Patent No.: US 11,579,578 B2
(45) Date of Patent: Feb. 14, 2023

(54) HIERARCHAL CONTROLLER LOGIC WITH INCREMENTAL UPDATES

(71) Applicant: Honeywell International Inc., Morris Plains, NJ (US)

(72) Inventors: Venugopala Nadumane, Bangalore (IN); Rajkumar Selvam, Bengaluru (IN); Nishant Omar, Bangalore (IN); Rajat Saha, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 198 days.

(21) Appl. No.: 16/831,018

(22) Filed: Mar. 26, 2020

(65) Prior Publication Data
US 2021/0302929 A1  Sep. 30, 2021

(51) Int. Cl.
   *G06F 8/658* (2018.01)
   *G06F 8/654* (2018.01)
   *G05B 19/042* (2006.01)

(52) U.S. Cl.
   CPC ......... *G05B 19/0426* (2013.01); *G06F 8/654* (2018.02); *G06F 8/658* (2018.02); *G05B 2219/25011* (2013.01); *G05B 2219/2614* (2013.01)

(58) Field of Classification Search
   CPC .......... G05B 2219/2614; G05B 19/042; G05B 19/0426; G05B 2219/25011; G06F 8/65; G06F 8/654; G06F 8/658
   See application file for complete search history.

(56) References Cited

U.S. PATENT DOCUMENTS

| | | |
|---|---|---|
| 4,019,175 A | 4/1977 | Nakao et al. |
| 5,781,776 A | 7/1998 | Johnston et al. |
| 6,738,388 B1 * | 5/2004 | Stevenson .......... G05B 19/4185 370/465 |
| 7,225,244 B2 | 5/2007 | Reynolds et al. |
| 7,343,226 B2 | 3/2008 | Ehlers et al. |
| 8,503,336 B2 | 8/2013 | Rappaport et al. |
| 8,532,797 B2 | 9/2013 | Gutha et al. |
| 8,640,098 B2 | 1/2014 | Nair et al. |

(Continued)

OTHER PUBLICATIONS

Extended European Search Report, EP Application No. 21161388.0, dated Aug. 4, 2021 (8 pages).

*Primary Examiner* — Wei Y Zhen
*Assistant Examiner* — Brahim Bourzik
(74) *Attorney, Agent, or Firm* — Seager, Tufte & Wickhem, LLP

(57) ABSTRACT

A controller that is configured to control operation of a building component may be programmed using a programming tool to build a controller logic that utilizes sub-structures organized within a hierarchal tree, which may then be downloaded to the controller. The controller is operated via the controller logic such that the controller controls operation of the building component. The programming tool may subsequently be used to update one or more of the sub-structures. The one or more updated sub-structures may be downloaded to the controller while not downloading one or more of the sub-structures that were not updated. The method includes continuing to control operation of the building component using the controller logic that now includes the one or more updated sub-structures.

17 Claims, 7 Drawing Sheets

(56) References Cited

U.S. PATENT DOCUMENTS

| | | | |
|---|---|---|---|
| 8,640,120 B2 | 1/2014 | Gutha et al. | |
| 8,719,385 B2 | 5/2014 | Nair et al. | |
| 8,818,346 B2 | 8/2014 | Frank | |
| 8,983,632 B2* | 3/2015 | Wacker | G06F 9/4881 |
| | | | 716/108 |
| 9,471,300 B2 | 10/2016 | Mangaiahgari | |
| 9,574,784 B2 | 2/2017 | Kowald et al. | |
| 2004/0194101 A1* | 9/2004 | Glanzer | G05B 19/056 |
| | | | 718/100 |
| 2004/0260431 A1* | 12/2004 | Keenan, Jr. | H04L 12/2803 |
| | | | 700/295 |
| 2004/0260734 A1* | 12/2004 | Ren | G06F 8/658 |
| | | | 707/999.203 |
| 2011/0196539 A1 | 8/2011 | Nair et al. | |
| 2012/0253482 A1* | 10/2012 | Wacker | G06F 9/4881 |
| | | | 700/23 |
| 2012/0272146 A1 | 10/2012 | D'Souza et al. | |
| 2015/0052515 A1* | 2/2015 | Choi | G06F 8/654 |
| | | | 717/174 |
| 2018/0267794 A1* | 9/2018 | Atchison | H04L 67/34 |
| 2020/0249646 A1* | 8/2020 | Gupta | G06F 8/65 |
| 2021/0157574 A1* | 5/2021 | Harata | G07C 5/0808 |

\* cited by examiner

HIERARCHAL CONTROLLER LOGIC WITH INCREMENTAL UPDATES

TECHNICAL FIELD

The present disclosure relates generally to configuring a controller. More particularly, the present disclosure relates to methods and systems for configuring a controller that utilizes hierarchal controller logic.

BACKGROUND

A controller may be used to control operations of a variety of different components. Programming tools may be used to program or otherwise configure a controller for controlling a particular function or feature of a piece of equipment. There may be a desire to make a relatively minor edit to the programming of the controller. This edit may be made using a programing tool. To implement the change, the programming tool typically needs to compile the entire control program and download the entire compiled control program to the controller. This can be time-consuming, particularly over a low bandwidth communication channel. There is a need for an improved way of programming or otherwise configuring controllers for operation, particularly with respect to making changes to an existing program or configuration.

SUMMARY

The present disclosure relates generally to methods and systems for programming a controller. In one example, a method of programming a controller that is configured to control operation of a building component includes using a programming tool to build controller logic that utilizes sub-structures organized within a hierarchal tree, and then downloading the controller logic including the sub-structures organized within the hierarchal tree to the controller. The controller is operated using the downloaded controller logic such that the controller controls operation of the building component. The programming tool may subsequently be used to change one or more of the sub-structures, such as editing one or more of the sub-structures, adding one or more sub-structures, deleting one or more of the sub-structures and/or otherwise changing the controller logic. The one or more updated sub-structures may be downloaded to the controller while not downloading one or more of the other sub-structures that were not updated. The method may include continuing to control operation of the building component using the controller logic that now includes the one or more updated sub-structures.

In another example, a controller that is configured to control operation of a building component includes a memory that is configured to store a modular controller logic that has a plurality of sub-structures that are arranged in a hierarchal tree. A processor is operatively coupled to the memory and is configured to execute the modular controller logic in order to control operation of the building component. A communications block is operably coupled to the processor and is configured to communicate with a programming tool that is used to create and/or edit the sub-structures within the modular controller logic. The modular controller logic is initially created using the programming tool and is downloaded to the controller via the communications block for execution. Subsequent updates to one or more of the sub-structures are subsequently downloaded to the controller via the communications block once updated via the programming tool, while sub-structures that were not updated are not downloaded.

In another example, a method of testing a modular controller logic within a programming tool is provided. The modular controller logic includes a plurality of sub-structures that are organized into a hierarchal tree. The modular controller logic is present within a controller and is synchronized within the programming tool, and the programming tool is configured to test execute the modular control logic directly within the programming tool. The modular control logic is built within the programming tool, and is test executed within the programming tool. One or more sub-structures within the modular control logic are updated to provide an updated modular control logic. The updated modular control logic is test executed within the programming tool.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
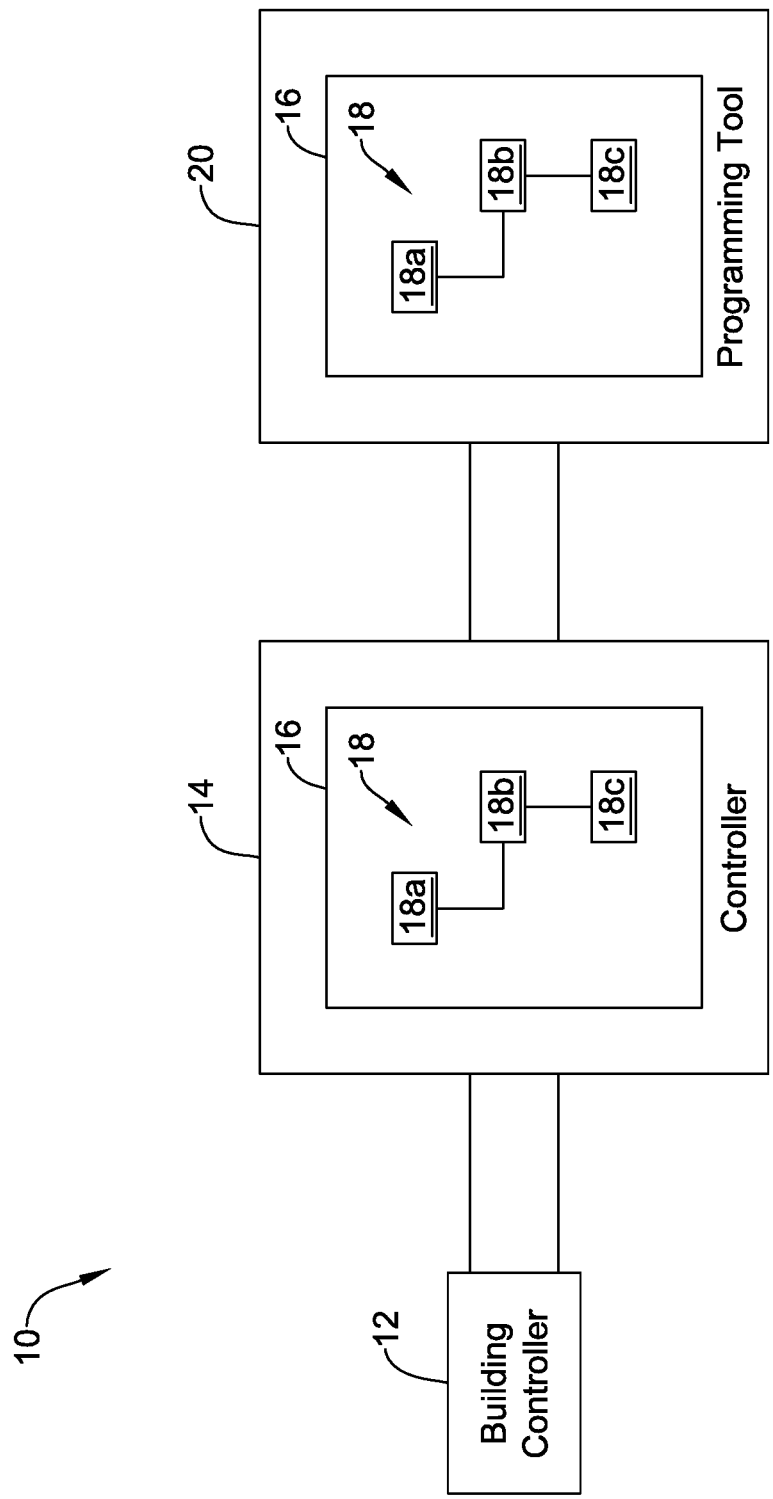
FIG. 1 is a schematic block diagram of an illustrative system that includes a controller and a programming tool used to program the controller.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative system 10. The illustrative system 10 includes a building component 12. The building component 12 may generically represent any of a number of different components that may be found within any of a variety of building systems. Illustrative but non-limiting examples of building systems include Heating, Ventilating and Air Conditioning (HVAC) systems, security systems, lighting systems, fire systems, and others. For example, if the building component 12 is part of an HVAC system, the building component 12 may represent part of an air handling system such as a Variable Air Volume (VAV) box. The building component 12 may represent a heat source such as a furnace or a boiler. The building component 12 may represent a cooling source such as an air conditioning compressor or a fan motor. These are just examples, and are not intended to be limiting in any manner or fashion.

The illustrative system 10 includes a controller 14. It will be appreciated that the controller 14 may be designed or programmed to control an operation of the building component 12. In some cases, the controller 14 may be a Direct Digital Control (DDC) controller, although this is not required in all cases. In some cases, the controller 14 may operate in accordance with a hierarchal control logic in which a number of sub-structures are arranged within a hierarchal structure. The controller 14 may work through each of the sub-structures within the hierarchal structure, in an order dictated by how each of the sub-structures are linked together. In FIG. 1, the controller 14 may be seen as including a hierarchal control logic 16. As illustrated, the hierarchal control logic 16 is simplified and includes several sub-structures 18 that are individually labeled as 18a, 18b, 18c. It will be appreciated that this is highly simplified, as the hierarchal control logic 16 may have any number of sub-structures, including but not limited to folders, function blocks and links between folders and/or function blocks. Illustrative but non-limiting examples of folders, function blocks and links therebetween may be found in U.S. Pat. Nos. 8,738,793 and 8,983,632, both of which are incorporated by reference herein in their entirety.

The illustrative system 10 includes a programming tool 20 that can be used to initially program the controller 14. For example, a user may use the programming tool 20 to create the hierarchal control logic 16 and then subsequently download the hierarchal control logic 16 from the programming tool 20 to the controller 14. If desired, the user may use the programming tool 20 to make one or more edits, corrections, additions or deletions to the hierarchal control logic 16. In some cases, only the sub-structures 18 that are edited, added, deleted, moved or otherwise changed may be downloaded to the controller 14, while the other sub-structures 18 that are not changed in any manner or fashion, are not downloaded again to the controller 14. It will be appreciated that this reduces the communication time that would otherwise be needed to update the hierarchal control logic 16. In some cases, the controller 14 may be configured to operate in accordance with each of the sub-structures 18 outlined within the hierarchal control logic 16 without having to separately compile each of the sub-structures individually, or compile the hierarchal control logic 16 as a whole. Instead, the controller 14 may include an engine that is configured to interpret the hierarchal control logic 16 and produce corresponding control signals and/or control commands for controlling one or more building components.

Figure 2:
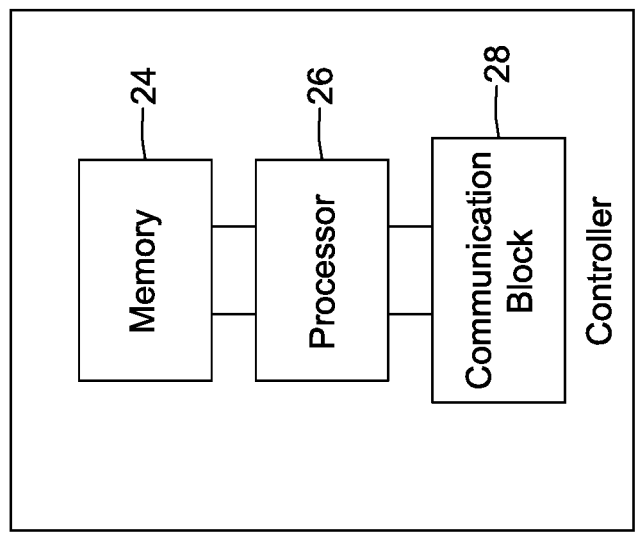
FIG. 2 is a schematic block diagram of an illustrative controller that may be used as part of the illustrative system of FIG. 1.

FIG. 2 is a schematic block diagram of an illustrative controller 22 that may be considered as an example of the controller 14 that is referenced with respect to FIG. 1. The illustrative controller 22 may be configured to control operation of a building component (such as but not limited to the building component 12) and may include a memory 24 that is configured to store modular controller logic such as the hierarchal control logic 16 that includes a plurality of sub-structures (such as but not limited to the sub-structures 18) that are arranged in a hierarchal tree. For example, the controller 22 may be configured to control operation of a Heating, Ventilating and Air Conditioning (HVAC) system component, a lighting system component, a water heater system component, a water softener system component, a sprinkler system component or a security system component.

The illustrative controller 22 includes a processor 26 that is operably coupled to the memory 24 and that is configured to execute the modular controller logic in order to control operation of the building component. A communications block 28 is operably coupled to the processor 26 and is configured to communicate with a programming tool (such as but not limited to the programming tool 20) that is used to create and/or edit the sub-structures within the modular controller logic. In some cases, the modular controller logic may be initially created using the programming tool and may be downloaded to the controller 22 via the communications block 28 for execution. Subsequent updates to one or more of the sub-structures may be subsequently downloaded to the controller 22 via the communications block 28, while not downloading one or more of the sub-structures that were not updated. At least some of the sub-structures may individually include one or more of a link, a folder and a function block. Each of the sub-structures may, for example, include an address linking path that defines an address space and a breadcrumb number that defines a unique component within the address space. It will be appreciated that the address linking path and breadcrumb number, in combination, link each sub-structure to a particular location within the modular controller logic so that the controller 22 knows how and when to execute the instructions present within each of the sub-structures.

Figure 3:
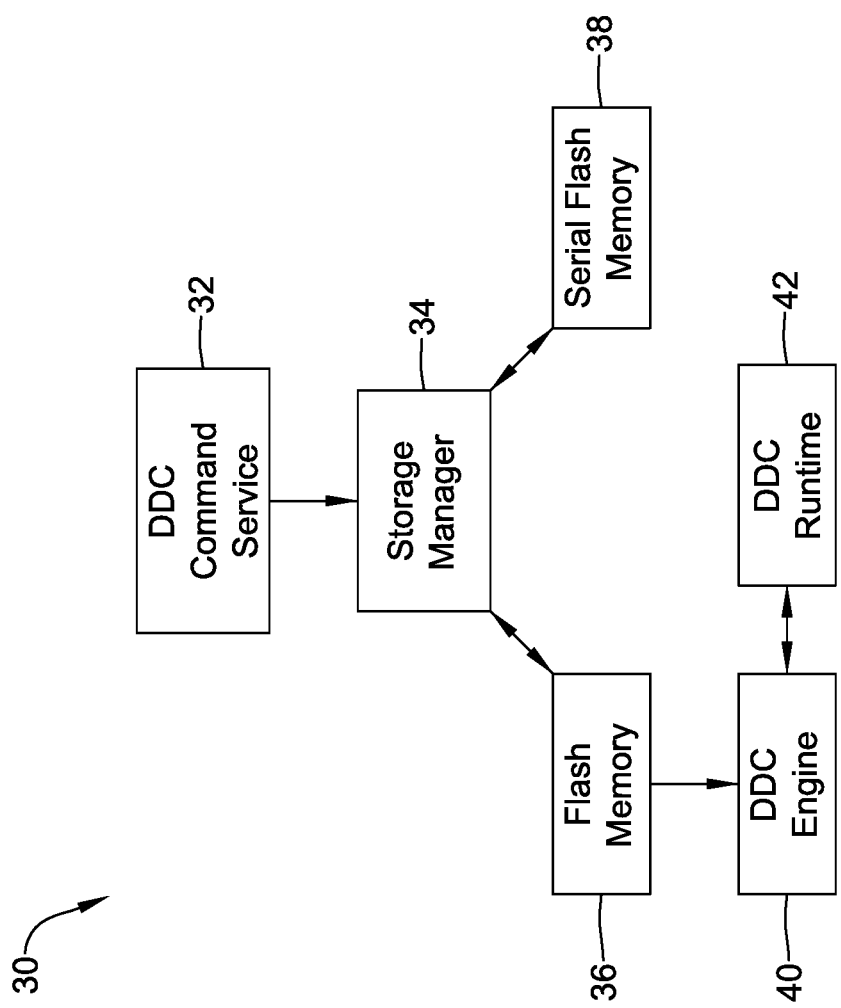
FIG. 3 is a schematic block diagram of an illustrative controller that may be used as part of the illustrative system of FIG. 1.

FIG. 3 is a schematic block diagram of an illustrative controller 30. The illustrative controller 30 may be considered as being an example of the controller 14 and/or the controller 22. In some instances, the controller 30 may include features and/or functionality ascribed to the controller 14 and/or the controller 22. Similarly, the controller 14 and/or the controller 22 may include features and/or functionality ascribed to the other, or may include features and/or functionality ascribed to the controller 30. As illustrated, the illustrative controller 30 is a DDC (Direct Digital Control) controller, but this is not required. The illustrative controller 30 includes a DDC Command Service block 32 and a Storage Manager 34. The controller 30 includes a Flash Memory block 36 and a Serial Flash Memory block 38. The Flash Memory block 36 may be used to store the modular control logic, while the Serial Flash Memory block 38 may be used to store other information, such as but not limited to data used for operating a user interface (not illustrated).

The Flash Memory block 36 is in communication with a DDC Engine 40. The DDC Engine 40 may be configured to execute each of the sub-structures included in the modular control logic, which itself may be stored within the Flash Memory block 36. A DDC Runtime block 42 remains in communication with the DDC Engine 40. In some cases, the modular control logic stored within the Flash Memory block 36 may be downloaded to a programming tool not previously used to create and/or edit the modular control logic. In some cases, graphical information (e.g. x, y display location of each of the function blocks as well as interconnect paths) and/or other information related to the modular control logic may be retrieved from the Serial Flash Memory block 38. This may allow a user to read and display the modular control logic of a controller using a programming tool that does not have immediate access to the programming data used to previously program the controller. This may be particularly useful when a technician arrives at a site without having access to previous programming tool data that was used to previously program the controller. The technician can connect his programming tool to any controller, at which time his programming tool may download the modular control logic from the Flash Memory block 36 and the graphical information (e.g. x, y location of each of the function blocks as well as interconnect paths) and/or other information related to the modular control logic from the Serial Flash Memory block 38 of the controller. His programming tool may use this downloaded information to re-create the programming tool environment that was previously used to program the controller. The technician can then make changes, and download those changes to the controller.

The DDC Command Service Block 32 may accept Commands from a programming tool. The programming tool may issue Commands to the DDC Command Service Block 32 to make changes or updates to one or more of the sub-structures of the modular control logic stored in the Flash Memory block 36. Such Commands may be used to selectively download the sub-structures that were changed using the programming tool while not downloading the sub-structures that did not change. Attached hereto is an Appendix that includes a number of example Commands and corresponding Responses that may be carried out using a programming tool to create and/or edit a modular control logic in a controller as described herein. The DDC Command Service Block 32 of the controller may be used to interpret and implement the Commands. A few illustrative Commands contained in the Appendix include Create Child, Delete Child, Set Properties, Set Predecessor and Set Multiple Links. It will be appreciated that the Command to Create a Child may be used if there is a desire to insert an additional function block within an existing modular control logic hierarchy. The Command Delete Child is, of course, the opposite, and would be used to delete a child function block that was previously created. The Set Properties Command may be used, for example, if a user desired to change or add additional properties to one or more function blocks. The Command to Set Predecessor may be used to select or change an order of operation of the function blocks. The Set Multiple Links Command may be used to instruct how a number of function blocks are to be operably coupled, meaning setting which inputs are coupled to which outputs. These are just examples. A more complete listing of illustrative available commands is contained in the attached Appendix.

Figure 4:
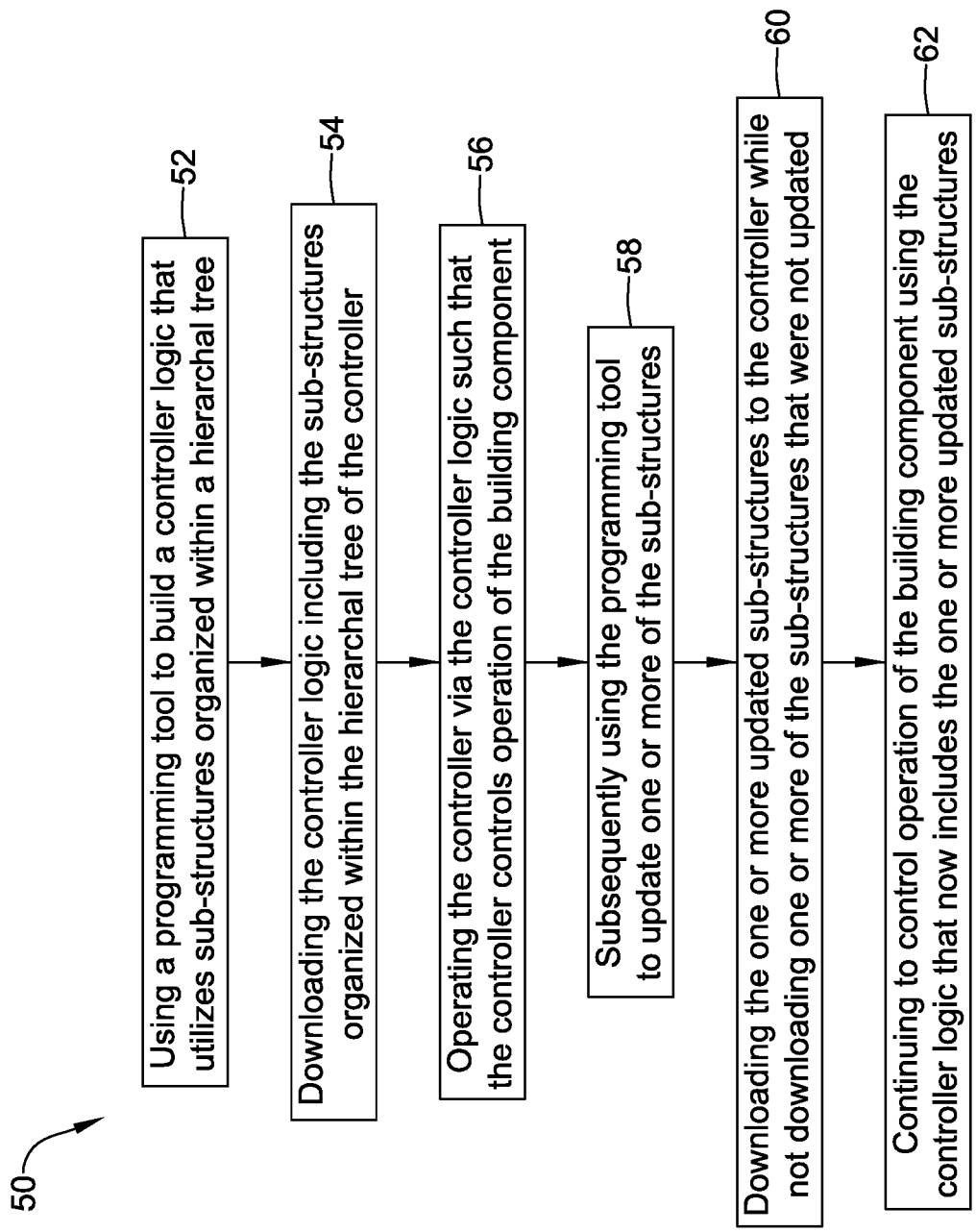
FIG. 4 is a flow diagram showing an illustrative method of programming a controller.

FIG. 4 is a flow diagram showing an illustrative method 50 of programming a controller (such as but not limited to the controller 14, the controller 22 and the controller 30) that is configured to control operation of a building component (such as but not limited to the building component 12). A programming tool may be used to build a controller logic that utilizes sub-structures that are organized within a hierarchal tree, as indicated at block 52. The controller logic, including the sub-structures that are organized within the hierarchal tree, may be downloaded to the controller, as indicated at block 54. The sub-structures may include one or more folders, and at least some of the one or more folders may include one or more function blocks. In some cases, the sub-structures may include one or more links for logically linking one or more of the function blocks. The sub-structures may, for example, include an address linking path that defines an address space as well as a breadcrumb number that defines a unique position within the address space. Accordingly, the combination of the address linking path and the breadcrumb uniquely identifies each of the sub-structures and their position relative to each of the other sub-structures as well as the hierarchal tree in which each of the sub-structures are arranged and organized.

The controller may be operated via the controller logic such that the controller controls operation of the building component, as indicated at block 56. The programming tool may subsequently be used to update one or more of the sub-structures, as indicated at block 58. The one or more updated sub-structures may be downloaded to the controller while not downloading one or more of the sub-structures that were not updated, as indicated at block 60. This may be accomplished using one or more of the Commands in the attached Appendix. Operation of the building component may continue using the controller logic that now includes the one or more updated sub-structures, as indicated at block 62.

In some cases, each of the sub-structures may include a calculated and stored Cyclic Redundancy Check (CRC) value and each updated sub-structure includes an updated calculated and stored CRC value. The overall controller logic itself may have a CRC value that is a summation of each of the CRC values for each of the sub-structures.

As noted with respect to block 60, updated sub-structures are downloaded from the programming tool to the controller. This may be accomplished using one or more of the Commands contained in the attached Appendix. In some cases, the programming tool may periodically be used to compare a current CRC value for each sub-structure to a stored CRC value for the same sub-structure to look for sub-structures that have been updated since a previous check. Any sub-structures that are thus found to have been updated in the programming tool since a previous check may be downloaded to the controller. In some cases each sub-structure within the programming tool may include a logical UPDATE flag, and updating a sub-structure includes setting the logical UPDATE flag for that sub-structure to true. The logical UPDATE flag may be checked for each sub-structure, and for each logical UPDATE flag set to true in the programming tool, the corresponding updated sub-structure may be downloaded to the controller. In some cases, downloading the one or more updated sub-structures to the controller occurs immediately after the programming tool is used to update the one or more updated sub-structures.

Figure 5:
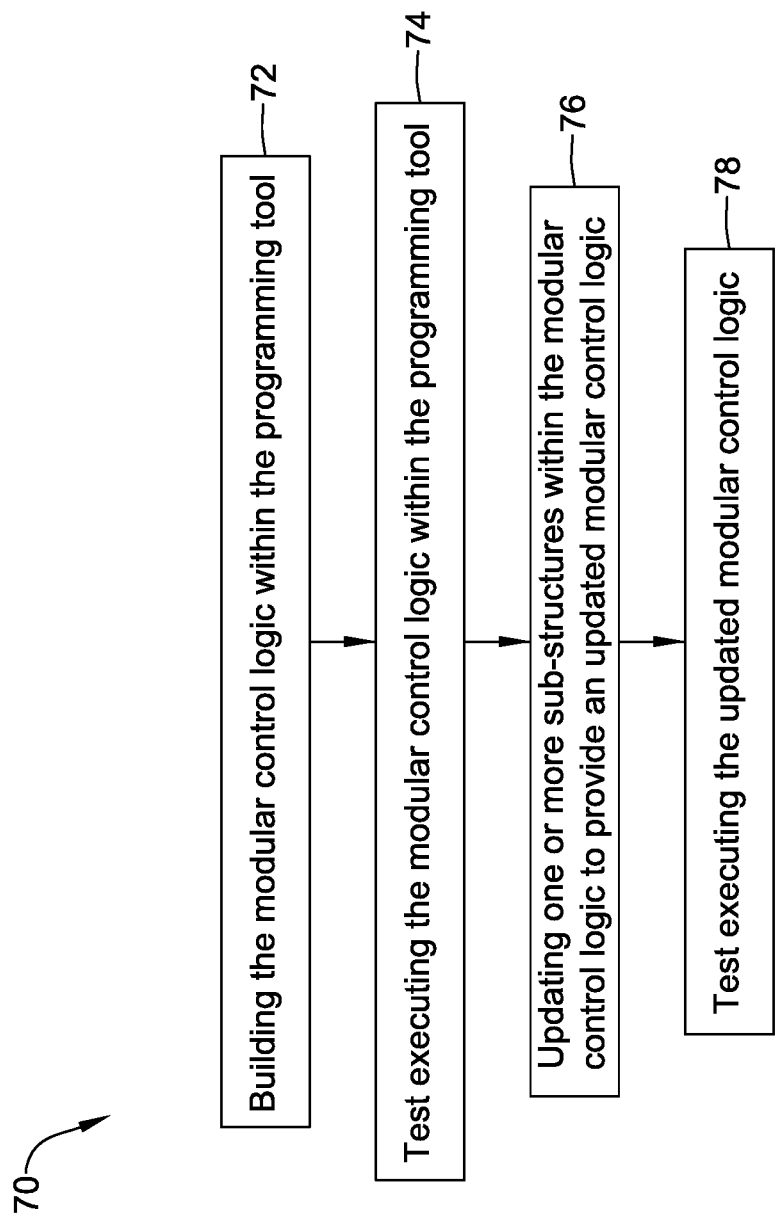
FIG. 5 is a flow diagram showing an illustrative method of testing a modular control logic within a programming tool.

FIG. 5 is a flow diagram showing an illustrative method 70 of testing a modular controller logic within a programming tool, where the modular controller logic includes a plurality of sub-structures that are organized into a hierarchal tree. The modular controller logic is present within a controller and is synchronized within the programming tool such that the programming tool is configured to test execute the modular control logic directly within the programming tool. The modular control logic may be built within the programming tool, as indicated at block 72. The modular control logic may be test executed within the programming tool, as indicated at block 74. One or more of the sub-structures within the modular control logic may be updated to provide an updated modular control logic, as indicated at block 76. The updated modular control logic may be test executed, as indicated at block 78. In some cases, the updated modular control logic may be downloaded to the controller so that the controller can execute the updated modular control logic.

Figure 6:
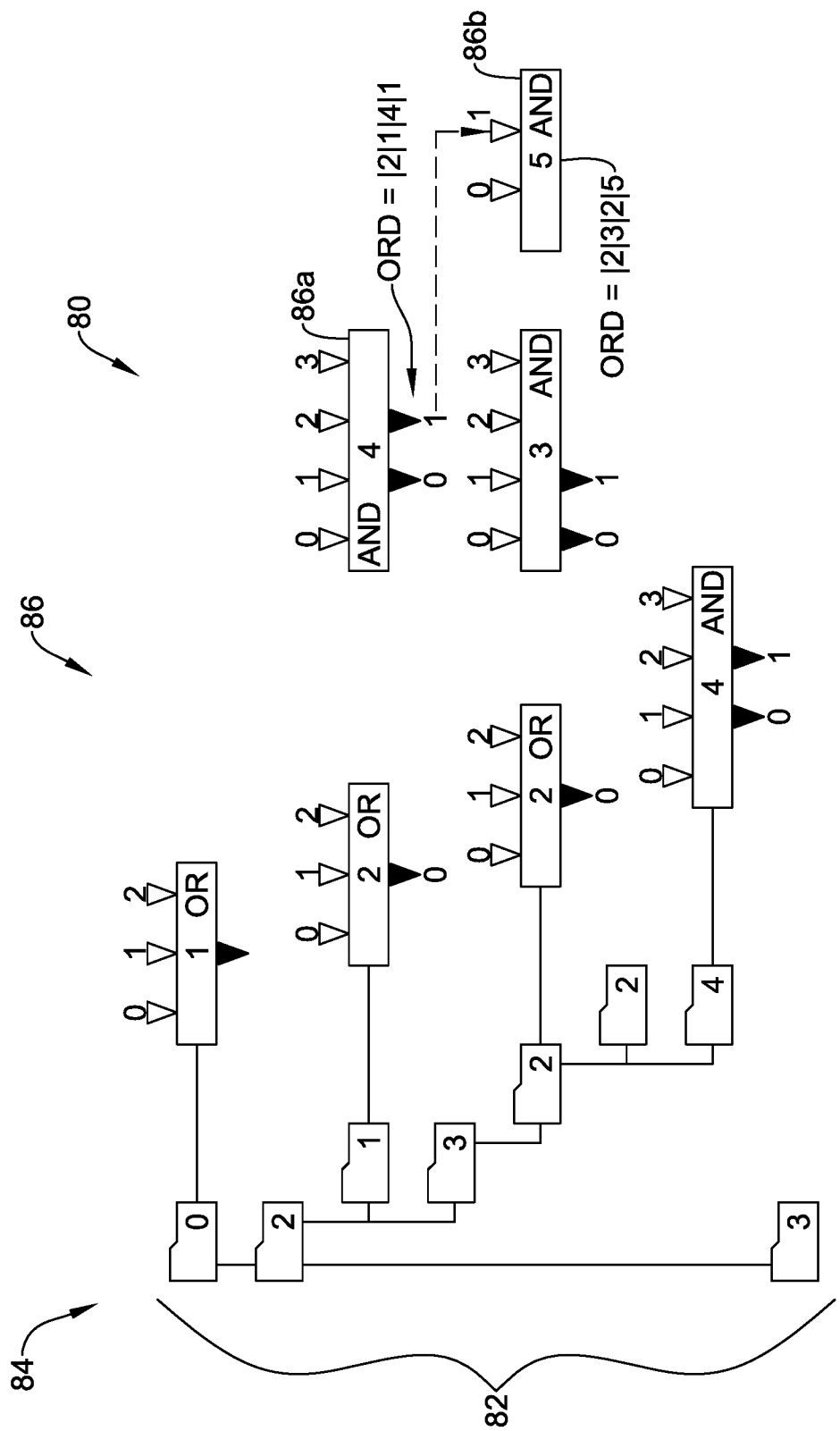
FIG. 6 is a schematic block diagram of an illustrative modular control logic.

FIG. 6 is a schematic block diagram showing an illustrative modular control logic 80. As shown, the illustrative modular control logic 80 includes a number of folders 82 that are organized within a hierarchal tree 84. Some of the folders 82 include one or more function blocks 86 contained therein. Each of the function blocks 86 may, for example, be OR function block, AND function block, a PID function block, among others. Each of the function blocks 86 include one or more inputs, shown as hollow carrots above each function block, and one or more outputs that are shown as solid carrots below each function block. In this particular example, a change is being made with respect to which output of one function block is being coupled with an input of another function block. Function block 86a can be seen as having an Output 0 and an Output 1. Function block 86b can be seen as having an Input 0 and an Input 1. The Output 1 of the function block 86a has an ORD, which may be considered as equivalent to an address linking path, of /2/1/4/1 while the function block 86b has an ORD of /2/3/2/5. These addresses show how each of the folders 82 and the function blocks 86 are operably coupled.

A programming tool such as the programming tool 20 (FIG. 1) may for example display a modular control logic such as the illustrative modular control logic 80 shown in FIG. 6. In some cases, a programming tool may have a display that is divided into a left panel and a right panel. The left panel, for example, may display a hierarchal tree, with folders, such as that shown in FIG. 6. The right panel, for example, may display a number of function blocks as shown in FIG. 6. The right panel may, for example, display a number of function blocks in greater detail, as shown in FIG. 7.

Figure 7:
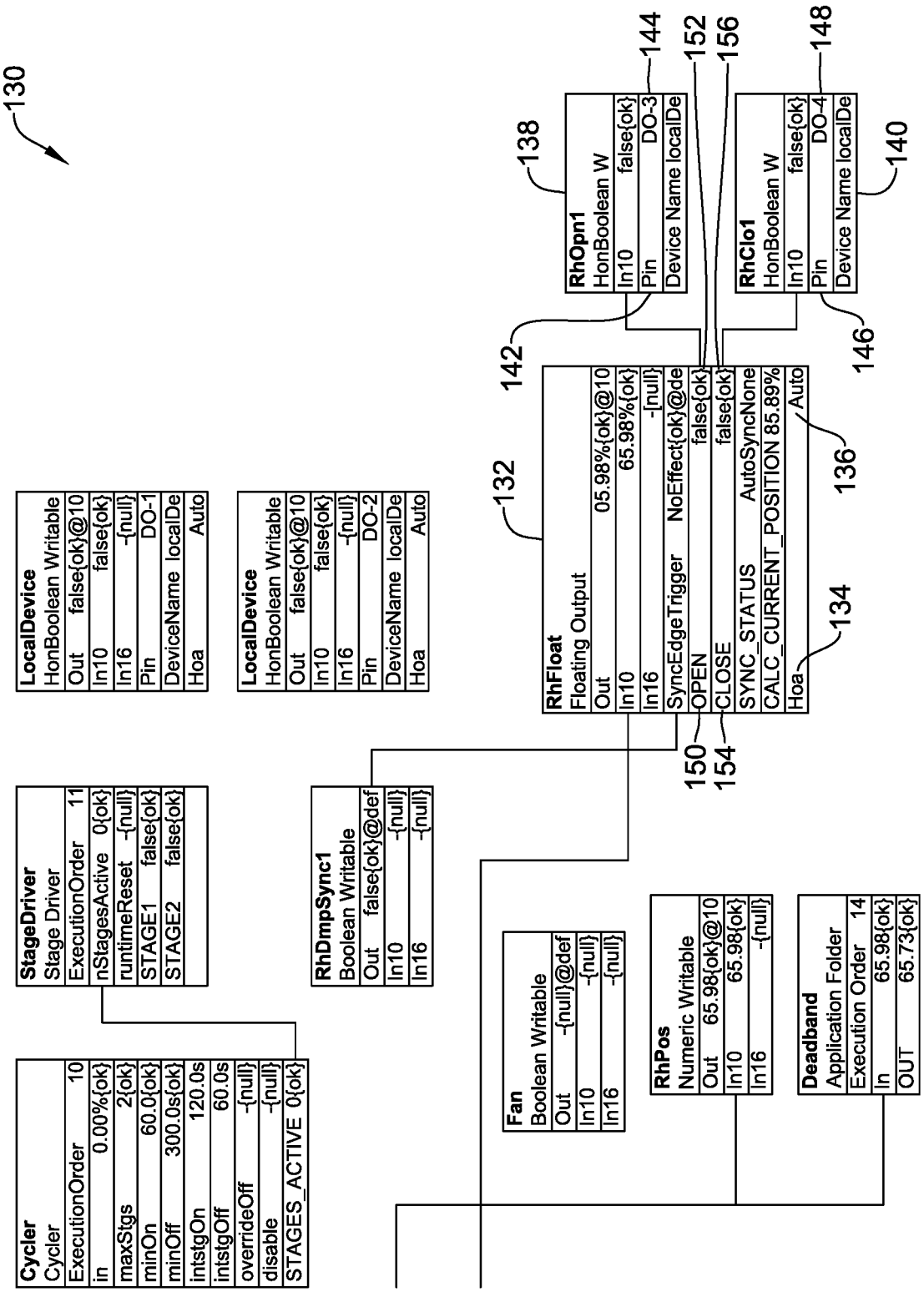
FIG. 7 is a screen capture of an illustrative function block wire sheet.

FIG. 7 is a screen capture of a portion of an illustrative but non-limiting wire screen 130. It will be appreciated that an actual wire screen 130 may be much larger, and include a large number of function blocks and accompanying links between the various inputs and outputs of each of the function blocks. To call out a particular example, it can be seen that the wire screen 130 includes an RHFLOAT floating output function block 132. As can be seen, the RHFLOAT floating output function block 132 displays various parameter values. In some cases, which parameter values are used and/or displayed may be user-programmed. In the example show, one of the displayed parameter values is an HOA parameter 134 and its accompanying value 136. The HOA parameter 134 represents a particular HOA (HAND-OFF-AUTO) switch that is associated with the RHFLOAT floating output function block 132. A HOA switch is a mechanically actuated switch that is actuatable between a HAND (H) setting which represents a manual "ON" setting, an OFF (O) setting which shuts off a particular output associated with that particular HOA switch, and an AUTO (A) setting which places the particular output in automatic control (e.g., to be controlled by a control algorithm of the controller).

The RHFLOAT floating output function block 132 is associated with a floating motor. A floating motor is a motor that can be driven in a first direction (say, to open a damper) by applying voltage pulses to a first electrical contact, and can be driven in a second direction (say, to close the damper) by applying voltage pulses to a second electrical contact. The floating motor would of course also have a ground contact. The RHFLOAT floating output function block 132 can be seen as being operably coupled to an RHOPN1 function block 138 that controls whether an output DO-3 of the controller is energized and a RHCL01 function block 140 that controls whether an output DO-4 is energized. This can be seen by a PIN parameter 142 and associated value 144 as shown in the RHOPN1 function block 138 and a PIN parameter 146 and associated value 148 as shown in the RHOPN1 function block 138. For purposes of illustration, say that the output DO-3, when energized, drives the floating motor in a first direction while the output DO-4, when energized, drives the floating motor in an opposing second direction. Neither are currently energized, as indicated in the RHFLOAT floating output function block 132 as seen by the OPEN parameter 150 and associated FALSE value 152 and the CLOSED parameter 154 and associated FALSE value 156. This is just an example wire screen of modular control logic for a controller.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of programming a controller that includes a memory for storing a controller logic and a processor operatively coupled to the memory for executing the controller logic stored in the memory to control operation of a building component, the method comprising:
    using a programming tool to build the controller logic that includes one or more function blocks and one or more links that logically link one or more of the function blocks;
    downloading the controller logic, including the one or more function blocks and the one or more links that logically link one or more of the function blocks, to the memory of the controller;

the processor of the controller executing the controller logic stored in the memory of the controller to control operation of the building component;

subsequently using the programming tool to update one or more of the function blocks and/or one or more links that logically link one or more of the function blocks of the controller logic, resulting in an updated controller logic;

the programming tool flagging the function blocks and/or the one or more links of the controller logic that have been updated using the programming tool;

the programming tool downloading the one or more flagged function blocks and/or one or more flagged links to the memory of the controller while not downloading the one or more of the function blocks and/or the one or more links that were not flagged by the programming tool, wherein the one or more of the function blocks and/or the one or more links that were not flagged by the programming tool and stored in the memory, in combination with the one or more flagged function blocks and/or the one or more flagged links downloaded to the memory of the controller, represent the updated controller logic in the memory of the controller; and the processor of the controller executing the updated controller logic stored in the memory of the controller to control operation of the building component.

2. The method of claim 1, wherein the controller logic include one or more folders.

3. The method of claim 2, wherein at least some of the one or more folders contain one or more of the function blocks.

4. The method of claim 1, wherein each of the one or more function blocks is associated with an address linking path that defines an address space in the memory of the controller, and a breadcrumb number that defines a unique component within the address space.

5. The method of claim 1, wherein each of the one or more function blocks and/or each of the one or more links is associated with a calculated and stored Cyclic Redundancy Check (CRC) value and each updated function block and/or updated link is associated with an updated calculated and stored CRC value.

6. The method of claim 5, wherein the controller logic has a CRC value that includes a summation of each of the CRC values for each of the one or more function blocks and/or each of the one or more links of the controller logic.

7. The method of claim 5, further comprising periodically using the programming tool to compare a current CRC value associated with one or more of the function blocks and/or one or more of the links to a stored CRC value associated with the same one or more function blocks and/or one or more links to look for function blocks and/or links that have been updated since a previous check.

8. The method of claim 7, further comprising downloading to the controller any function blocks and/or links that have been found to have been updated since a previous download.

9. The method of claim 1, wherein each function block in the memory of the controller has an associated address linking path that defines an address space in the memory, a breadcrumb number that defines a unique component within the address space and a Cyclic Redundancy Check (CRC) value.

10. The method of claim 1, further comprising providing each function block and/or link with a logical UPDATE flag, and updating a function block and/or link includes setting the logical UPDATE flag for that function block and/or link to true.

11. The method of claim 10, further comprising checking the logical UPDATE flag for each function block and/or link, and for each logical UPDATE flag set to true, downloading the corresponding updated function block and/or link to the memory of the controller.

12. The method of claim 1, wherein the step of downloading the one or more flagged function blocks and/or one or more flagged links to the memory of the controller occurs immediately after the programming tool is used to update the one or more updated function blocks and/or one or more updated links.

13. A controller configured to control operation of a building component, the controller comprising:

a memory that is configured to store a modular controller logic, the modular controller logic comprising a plurality of sub-structures that are arranged in a hierarchal tree, the sub-structures including one or more folders with one or more function blocks within at least some of the one or more folders and one or more links for logically linking one or more of the function blocks;

a processor that is operatively coupled to the memory and configured to execute the modular controller logic stored in the memory in order to control operation of the building component;

a communications block that is operably coupled to the processor, the communications block configured to communicate with a programming tool that is used to create and/or edit the sub-structures within the modular controller logic that is stored in the memory;

wherein the modular controller logic is initially created using the programming tool and is downloaded to the memory of the controller via the communications block for execution;

wherein subsequent updates to one or more of the sub-structures are subsequently downloaded to the memory of the controller via the communications block once updated via the programming tool, while not downloading to the memory of the controller one or more of the sub-structures that were not updated, resulting in an updated modular controller logic in the memory of the controller; and the processor executing the updated modular controller logic stored in the memory of the controller to control operation of the building component.

14. The controller of claim 13, wherein the controller is configured to control operation of a Heating, Ventilating and Air Conditioning (HVAC) system component, a lighting system component, a water heater system component, a water softener system component, a sprinkler system component or a security system component.

15. The controller of claim 13, wherein each of the sub-structures further include an address linking path that defines an address space in the memory and a breadcrumb number that defines a unique component within the address space of the memory.

16. The method of claim 1, further comprising:

after using the programming tool to update one or more of the function blocks and/or one or more links that logically link one or more of the function blocks of the controller logic, test executing the updated controller logic within the programming tool before the programming tool downloading the one or more flagged function blocks and/or one or more flagged links to the memory of the controller while not downloading one or more of the function blocks and/or one or more links that were not flagged by the programming tool.

17. A method of programming a controller that is configured to control operation of a building component, the method comprising:

using a programming tool to build a controller logic that includes one or more function blocks and one or more links that logically link one or more of the function blocks;

downloading the controller logic, including the one or more function blocks and the one or more links that logically link one or more of the function blocks, to the controller;

operating the controller via the controller logic such that the controller controls operation of the building component;

subsequently using the programming tool to update one or more of the function blocks and/or one or more links that logically link one or more of the function blocks, resulting in an updated controller logic;

after updating the one or more of the function blocks and/or one or more links that logically link one or more of the function blocks, test executing the updated controller logic using the programming tool;

after test executing the updated control logic using the programming tool, downloading the one or more updated function blocks and/or one or more updated links to the controller while not downloading one or more of the function blocks and/or one or more links that were not updated; and continuing to control operation of the building component using the updated controller logic that now includes the one or more updated function blocks and/or one or more updated links.

* * * * *